United States Patent
Buto et al.

(10) Patent No.: US 10,971,309 B2
(45) Date of Patent: Apr. 6, 2021

(54) CAPACITOR

(71) Applicant: Panasonic Intellectual Property Management Co., Ltd., Osaka (JP)

(72) Inventors: Hirokazu Buto, Shimane (JP); Masahito Sano, Toyama (JP); Toshiharu Saito, Toyama (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 137 days.

(21) Appl. No.: 16/354,502

(22) Filed: Mar. 15, 2019

(65) Prior Publication Data
US 2019/0214197 A1    Jul. 11, 2019

Related U.S. Application Data

(63) Continuation of application No. PCT/JP2017/027427, filed on Jul. 28, 2017.

(30) Foreign Application Priority Data

Sep. 29, 2016 (JP) .............................. JP2016-190608

(51) Int. Cl.
*H01G 4/33* (2006.01)
*H01G 4/06* (2006.01)
(Continued)

(52) U.S. Cl.
CPC .................. *H01G 4/33* (2013.01); *H01G 2/10* (2013.01); *H01G 4/06* (2013.01); *H01G 4/18* (2013.01); *H01G 4/224* (2013.01); *H01G 4/228* (2013.01)

(58) Field of Classification Search
CPC .......... H01G 4/224; H01G 4/228; H01G 4/32; H01G 2/10
See application file for complete search history.

(56) References Cited

U.S. PATENT DOCUMENTS

| 4,819,115 | A | * | 4/1989 | Mitchell | ................ H01G 4/228 361/308.3 |
| 2007/0084043 | A1 | * | 4/2007 | Hosking | ................ H01G 4/232 29/621 |
| 2017/0236649 | A1 | * | 8/2017 | Piller | ..................... H01G 9/042 361/529 |

FOREIGN PATENT DOCUMENTS

| JP | 61-232604 | 10/1986 |
| JP | 5-174938 | 7/1993 |

(Continued)

OTHER PUBLICATIONS

International Search Report of PCT application No. PCT/JP2017/027427 dated Oct. 24, 2017.

*Primary Examiner* — Eric W Thomas
(74) *Attorney, Agent, or Firm* — McDermott Will and Emery LLP

(57) ABSTRACT

A capacitor includes: a capacitor element; an insulation coated lead wire connected to an electrode of a capacitor element; and a resin covering the capacitor element and the insulation coated lead wire in a state that one end of the insulation coated lead wire is exposed from the resin. The insulation coated lead wire includes: a stranded wire in which a plurality of conductive wires are twisted with each other; and an insulator covering the stranded wire. An exposed part of the stranded wire is connected to the electrode of the capacitor element. The exposed part is a part exposed from the insulator at another end of the insulation coated lead wire. The exposed part is entirely covered with solder.

5 Claims, 12 Drawing Sheets

(51) Int. Cl.
*H01G 2/10* (2006.01)
*H01G 4/228* (2006.01)
*H01G 4/224* (2006.01)
*H01G 4/18* (2006.01)

(56) References Cited

FOREIGN PATENT DOCUMENTS

| | | | | |
|---|---|---|---|---|
| JP | 6-043533 U | | 6/1994 | |
| JP | H0643533 U | * | 6/1994 | |
| JP | 2004-235485 | | 8/2004 | |
| JP | 2010021318 A | * | 1/2010 | ............ H01G 4/224 |

* cited by examiner

CAPACITOR

RELATED APPLICATIONS

This application is a continuation of the PCT International Application No. PCT/JP2017/027427 filed on Jul. 28, 2017, which claims the benefit of foreign priority of Japanese patent application No. 2016-190608 filed on Sep. 29, 2016, the contents all of which are incorporated herein by reference.

BACKGROUND

1. Technical Field

The present disclosure relates to a capacitor such as a film capacitor.

2. Description of the Related Art

A film capacitor is conventionally known, in which a capacitor element is coated with resin. The capacitor is made by winding or laminating metalized films, thermal spraying metal on the end faces to form end face electrodes, and connecting lead wires to the end face electrodes (for example, see Unexamined Japanese Patent Publication No. S61-232604). Regarding such a film capacitor, a top end of each lead wire opposite to a base end, which is connected to the end face electrode, is exposed from the resin to be connected to an external connection terminal.

SUMMARY

A capacitor according to a main aspect of the present disclosure includes: a capacitor element; an insulation coated lead wire connected to an electrode of the capacitor element; and a resin covering the capacitor element and the insulation coated lead wire in a state that one end of the insulation coated lead wire is exposed from the resin. The insulation coated lead wire includes: a stranded wire in which a plurality of conductive wires are twisted with each other; and an insulator covering the stranded wire. An exposed part of the stranded wire is connected to the electrode of the capacitor element. The exposed part is a part exposed from the insulator at another end of the insulation coated lead wire. In the above, the exposed part is entirely covered with solder.

According to the present disclosure, it is possible to provide a capacitor in which water is prevented from entering through a lead wire, so that a capacitor element can be prevented from deteriorating.

Effects or significance of the present disclosure will be further clarified in the following description of exemplary embodiments. However, the exemplary embodiment described below is merely an example of practicing the present disclosure, and the present disclosure is not at all limited to the examples described in the following exemplary embodiments.

DETAILED DESCRIPTION OF EMBODIMENT

Figure 1A:
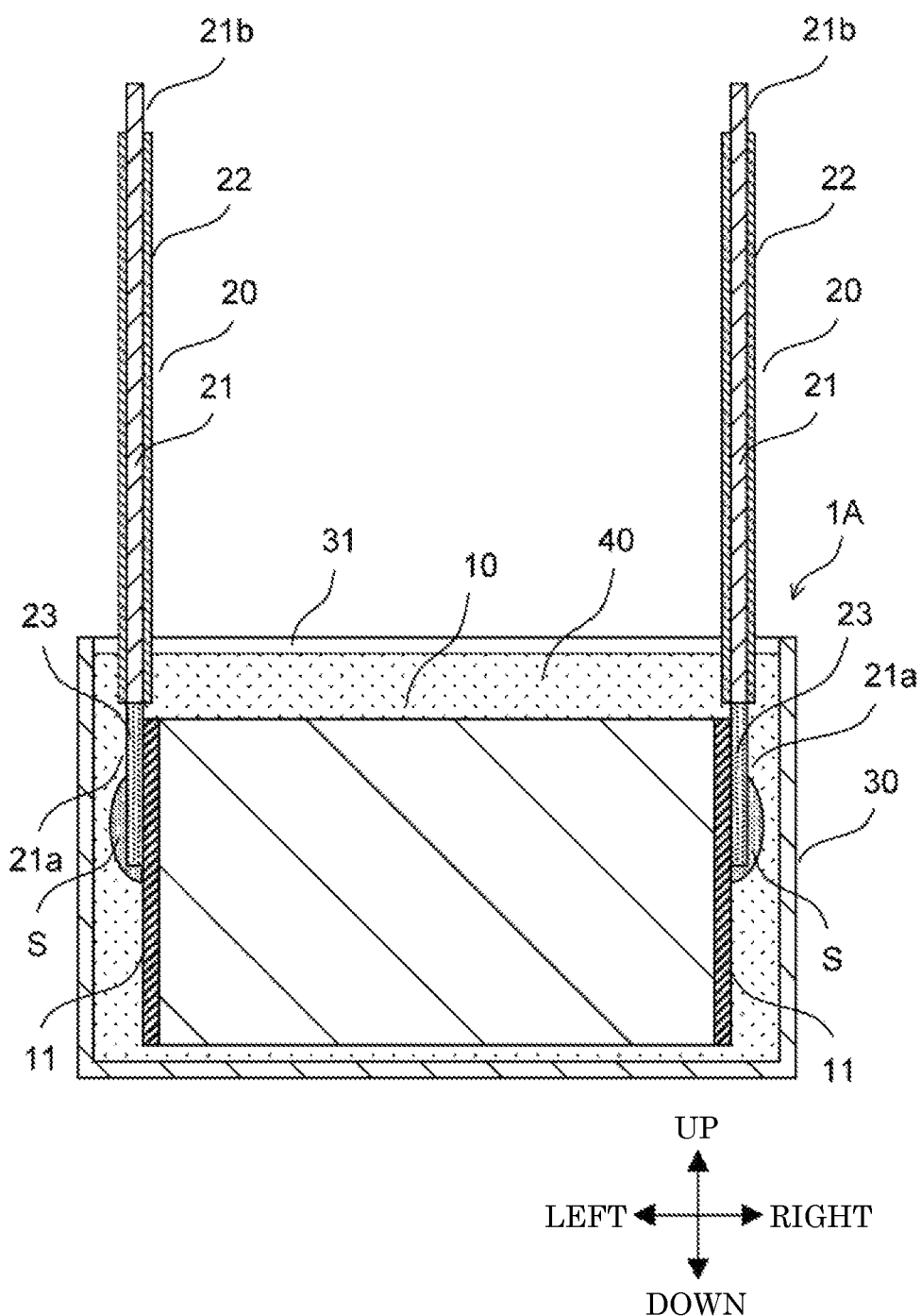
FIG. 1A is a front cross-sectional view illustrating a film capacitor according to a first exemplary embodiment cut to include positions of right and left insulation coated lead wires.

Prior to describing exemplary embodiments of the present disclosure, a brief description will be given to a problem found in a conventional capacitor. As a lead wire of a film capacitor in the above background art, it is possible to use a stranded wire type insulation coated lead wire in which, for example, a stranded wire made of a plurality of fine conductive wires twisted with each other is coated with an insulator. When a stranded wire type insulation coated lead wire is used, a larger allowable current can be provided for the same wire diameter compared with a solid core type insulation coated lead wire made of a single conductive wire coated with an insulator, and since the stranded wire type insulation coated wire is flexible, workability of connection to an external connection terminal is better.

When a film capacitor is used in a high humidity environment, water (moisture) easily enters inside the insulator (that is, inside the lead wire) from the top end side of a lead wire. When a stranded wire type insulation coated lead wire is used for a film capacitor, the water having entered inside the insulator can easily reach a base end side of the lead wire through minute gaps generated between the conductive wires of the stranded wire. For this reason, such water may cause oxidation of the end face electrode and the internal deposition electrode, thereby deteriorating the capacitor element.

In view of the above, the present disclosure provides a capacitor in which water is prevented from entering through the lead wire, so that a capacitor element can be prevented from deteriorating.

Hereinafter, a film capacitor, which is an exemplary embodiment of a capacitor of the present disclosure, will be described with reference to the drawings. For the sake of convenience, directions including front and rear, left and right, and up and down are added to the drawings as appropriate. Note that directions in the drawings are not absolute directions but relative directions of the film capacitor.

First Exemplary Embodiment

First, film capacitor 1A according to a first exemplary embodiment will be described.

In the present exemplary embodiment, film capacitor 1A is an example of a "capacitor" recited in the claims. End face electrode 11 is an example of an "electrode" recited in the claims. First exposed part 21a is an example of an "exposed part" recited in the claims. Filler resin 40 is an example of "resin" recited in the claims.

However, the above description is only intended to define correspondences between components in the claims and components in the exemplary embodiment. The correspondences described above do not limit the scope of the disclosure in the claims to the configuration described in the exemplary embodiment.

Figure 1B:
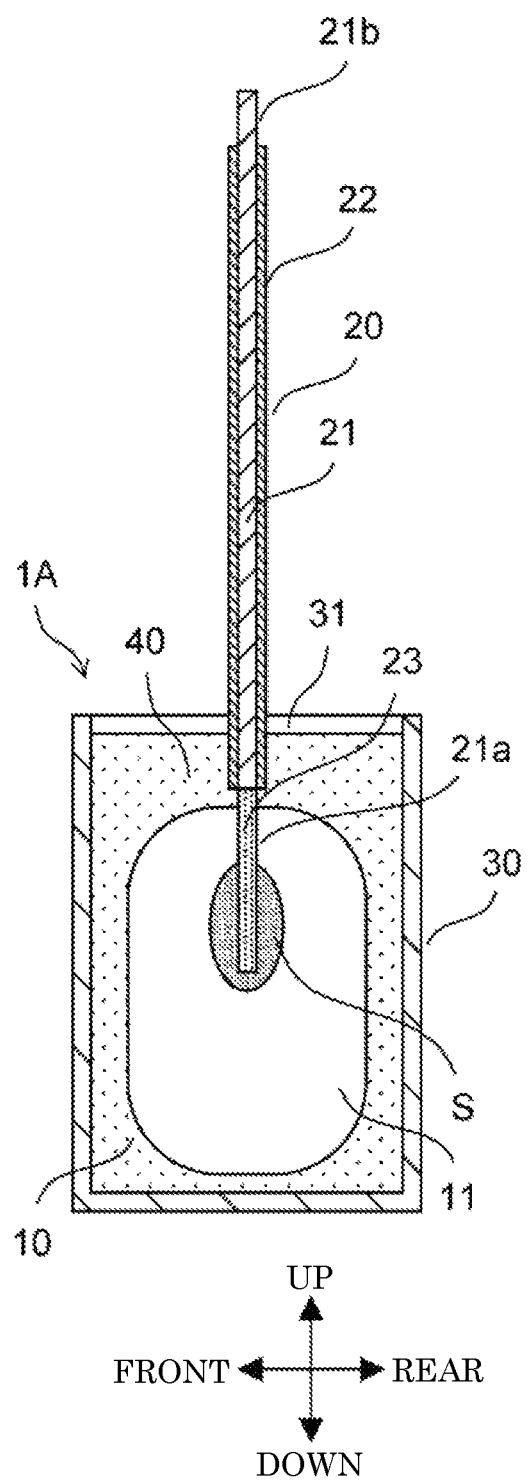
FIG. 1B is a right-side cross-sectional view illustrating the film capacitor according to the first exemplary embodiment cut at a position of the right-side insulation coated lead wire.
Figure 1C:
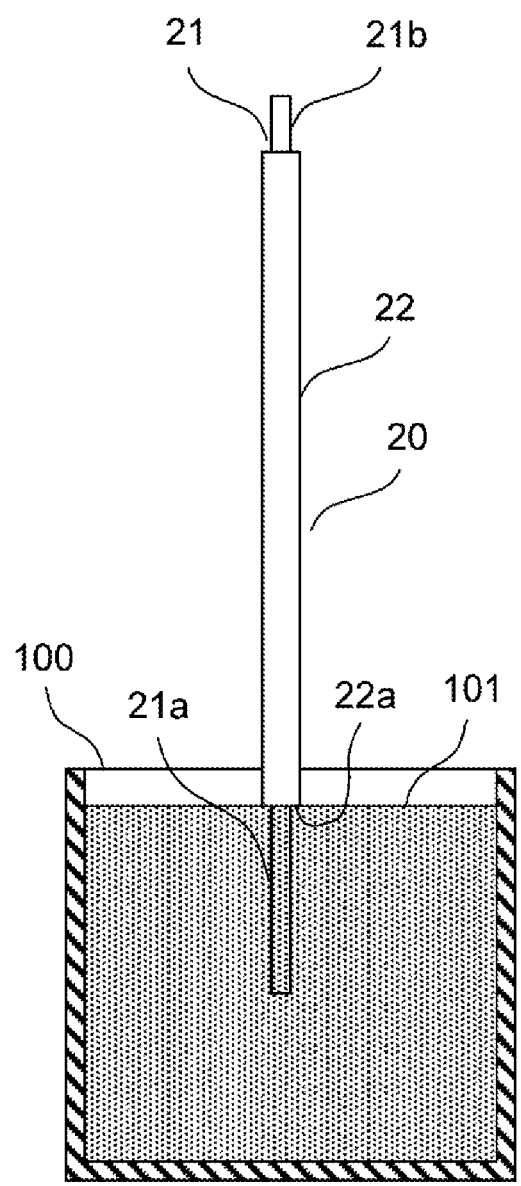
FIG. 1C is a diagram for explaining a method for attaching solder to a first exposed part of a stranded wire according to the first exemplary embodiment.

FIG. 1A is a front cross-sectional view illustrating film capacitor 1A cut to include positions of right and left insulation coated lead wires 20 according to the first exemplary embodiment, and FIG. 1B is a right-side cross-sectional view illustrating film capacitor 1A cut at a position of right-side insulation coated lead wire 20 according to the first exemplary embodiment. FIG. 1C is a diagram for explaining a method for attaching solder 23 to a first exposed part 21a of a stranded wire 21 according to the first exemplary embodiment.

As shown in FIG. 1A and FIG. 1B, film capacitor 1A includes capacitor element 10, a pair of insulation coated lead wires 20, case 30, and filler resin 40.

Capacitor element 10 is formed by stacking two metalized films that are dielectric films on each of which a deposition electrode is formed by deposition of aluminum, winding or laminating the stacked metalized films, and pressing the laminated metalized films in a flat shape. On each of both end faces of capacitor element 10, end face electrode 11 is formed by splaying metal such as zinc. As a material for the deposition electrodes of capacitor element 10, metals other than aluminum, such as zinc and magnesium, can be used. Alternatively, it is possible to form the deposition electrodes by deposition of a plurality of metals of these metals, or it is possible to form the deposition electrodes by deposition of an alloy made of these metals.

A pair of insulation coated lead wires 20 (hereinafter, each simply referred to as "lead wire 20") are each configured with stranded wire 21 including a plurality of conductive wires stranded with each other and insulator 22 covering a periphery of stranded wire 21. Each stranded wire 21 is made of, for example, a copper wire, and insulator 22 is made of, for example, a heat-resistant vinyl resin.

Regarding each lead wire 20, stranded wire 21 is exposed by a predetermined length from insulator 22, on a base end side of lead wire 20. First exposed part 21a of stranded wire 21 which is exposed at a side close to the base end is entirely covered with solder 23.

In order to attach solder 23 to first exposed part 21a of stranded wire 21, solder bath 100 shown in FIG. 1C is used. In solder bath 100, solder 101 in a molten state (hereinafter, referred to as "molten solder 101") is stored. First exposed part 21a of stranded wire 21 is immersed in molten solder 101 such that end face 22a of insulator 22 at a side close to the base end of lead wire 20 is flush with a liquid surface of molten solder 101 in solder bath 100. When lead wire 20 is pulled out from solder bath 100 and molten solder 101 is cooled and solidified, first exposed part 21a is entirely covered with solder 23. Further, since minute gaps among the conductive wires of stranded wire 21 are easily generated, molten solder 101 can spread into these gaps easily. Therefore, not only outer side of stranded wire 21 is covered with solder 23, but also these minute gaps, that is, inside of stranded wire 21 is impregnated with solder 23.

First exposed part 21a of stranded wire 21 to which solder 23 is attached in this way is connected to end face electrode 11 of capacitor element 10 by soldering using solder S for connection.

In addition, lead wire 20 is also exposed by a predetermined length from insulator 22 at a side close to a top end side of stranded wire 21. When film capacitor 1A is mounted on an external device or the like, external connection terminals (not shown) are connected to second exposed parts 21b of stranded wires 21 exposed at the side close to the top end side.

Case 30 is formed with resin material such as polyphenylene sulfide (PPS) in a substantially cuboid box shape with an open top. Capacitor element 10 and lead wires 20 are housed in case 30, and top end side parts of lead wires 20 protrude outside from opening 31 of case 30.

Filler resin 40 is made of a thermosetting resin, is injected into case 30 in a molten state, and is cured by heating case 30. Filler resin 40 covers capacitor element 10 and base end side parts of lead wires 20 to protect capacitor element 10 and the base end side parts of lead wires 20 from moisture and impact. The top end side parts of lead wires 20 are exposed from filler resin 40.

When film capacitor 1A is used in a high humidity environment, water (moisture) may enter inside insulators 22 from the top end side parts of lead wires 20. The water having entered easily reaches the base end side parts of lead wires 20 by passing through minute gaps among stranded wires 21. In the present exemplary embodiment, even if the above situation has occurred, first exposed part 21a of each stranded wire 21 is entirely covered with solder 23, and the water is thus stopped by solder 23, whereby each end face electrode 11 is prevented from being exposed to the water. In addition, since these gaps are filled with solder 23 having penetrated into an inside of first exposed part 21a of each stranded wire 21, that is, the gaps among the conductive wires, the effect of stopping the water is further improved.

As described above, with the present exemplary embodiment, when lead wires 20 of a stranded wire type which has a large allowable current and which is good in workability is used, water is prevented from entering through lead wires 20, and it is therefore possible to prevent capacitor element 10 from deteriorating due to oxidation of end face electrodes 11 and the internal deposition electrodes.

Although the first exemplary embodiment of the present disclosure has been described above, the present disclosure is not limited to the first exemplary embodiment, and the first exemplary embodiment can be modified as described below, for example.

First Modification of First Exemplary Embodiment

Figure 2A:
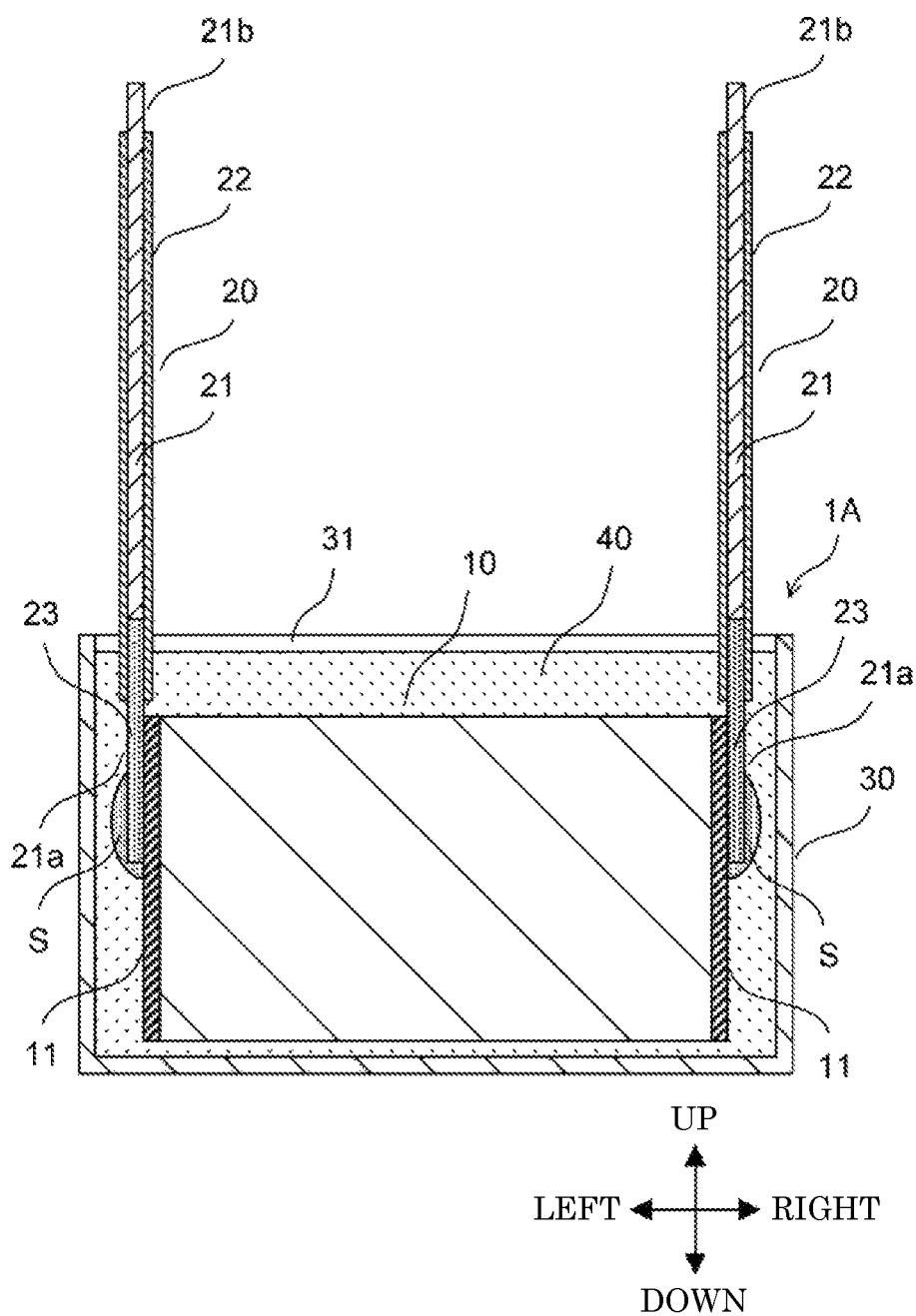
FIG. 2A is a front cross-sectional view illustrating the film capacitor according to a first modification cut to include positions of the right and left insulation coated lead wires.
Figure 2B:
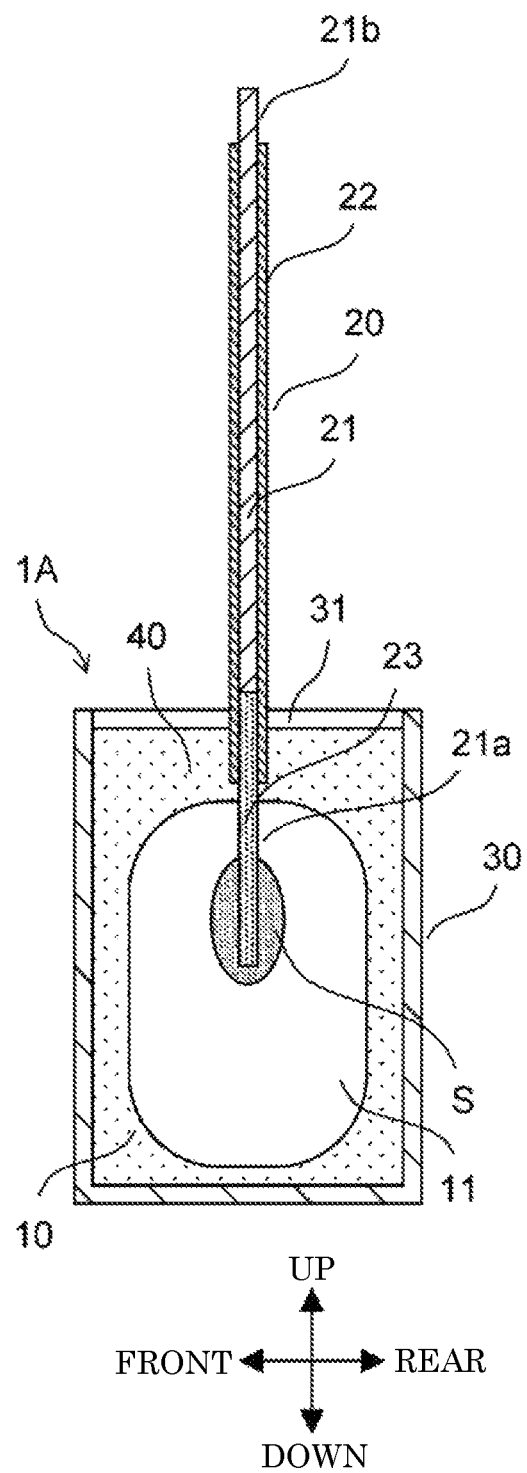
FIG. 2B is a right-side cross-sectional view illustrating the film capacitor according to the first modification cut at a position of the right-side insulation coated lead wire.
Figure 2C:
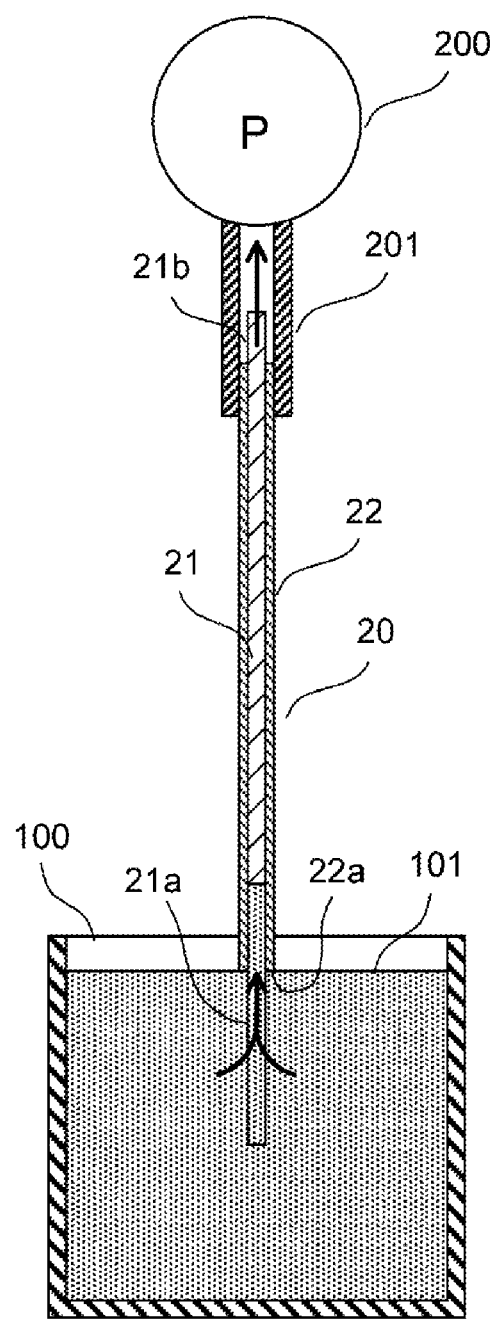
FIG. 2C is a diagram for explaining a method for causing the solder to enter inside the insulator according to the first modification.

FIG. 2A is a front cross-sectional view illustrating film capacitor 1A cut to include positions of right and left insulation coated lead wires 20 according to a first modification, and FIG. 2B is a right-side cross-sectional view illustrating film capacitor 1A cut at a position of right-side insulation coated lead wire 20 according to the first modification. FIG. 2C is a diagram for explaining a method for causing solder 23 enter inside insulator 22 according to the first modification.

As shown in FIG. 2A and FIG. 2B, in the present modification, solder 23 attached to first exposed part 21a of stranded wire 21 of each lead wire 20 is made to enter further inside insulator 22, and spread into stranded wire 21 at a part coated with insulator 22. The other configurations are the same as in the first exemplary embodiment.

In order to make solder 23 enter inside insulator 22, it is considered that when solder 23 is attached to first exposed part 21a of stranded wire 21 as described with reference to FIG. 1C, an immersing time for which first exposed part 21a is immersed in molten solder 101 is made longer than in the first exemplary embodiment. In this manner, molten solder 101 climbs up the minute gaps among stranded wires 21 by capillary action, and solder 23 penetrates into stranded wire 21 at a part coated with insulator 22.

In order to make solder 23 enter inside insulator 22 more effectively, it is better to use vacuum pump 200 as shown in FIG. 2C. In this case, suction nozzle 201 of vacuum pump 200 is attached to the top end of lead wire 20, and air is suctioned by vacuum pump 200 from the top end side part of lead wire 20. This suction causes molten solder 101 in solder bath 100 to easily climb up the minute gaps among stranded wires 21, and solder 23 can be made to penetrate into stranded wire 21 to a deeper position inside insulator 22.

With the configuration of the present modification, it is possible to make a part of stranded wire 21 to which solder 23 is attached and insulator 22 overlap each other. Hence, solder 23 can more satisfactorily confine the water, which has entered inside insulator 22, inside insulator 22. It is thus possible to further improve the effect of preventing capacitor element 10 from deteriorating.

Second Modification of First Exemplary Embodiment

Figure 3A:
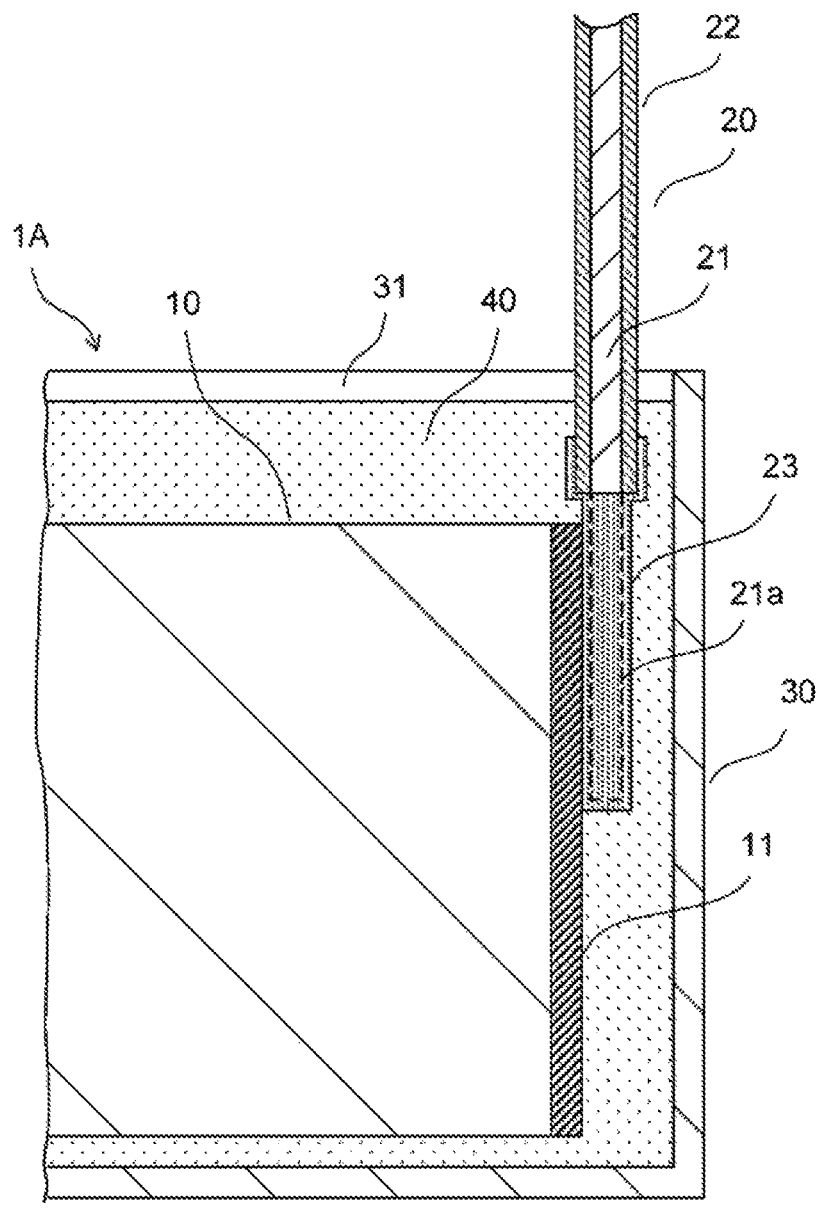
FIG. 3A is a front cross-sectional view illustrating a main part of the film capacitor cut at a position of the insulation coated lead wire according to a second modification.
Figure 3B:
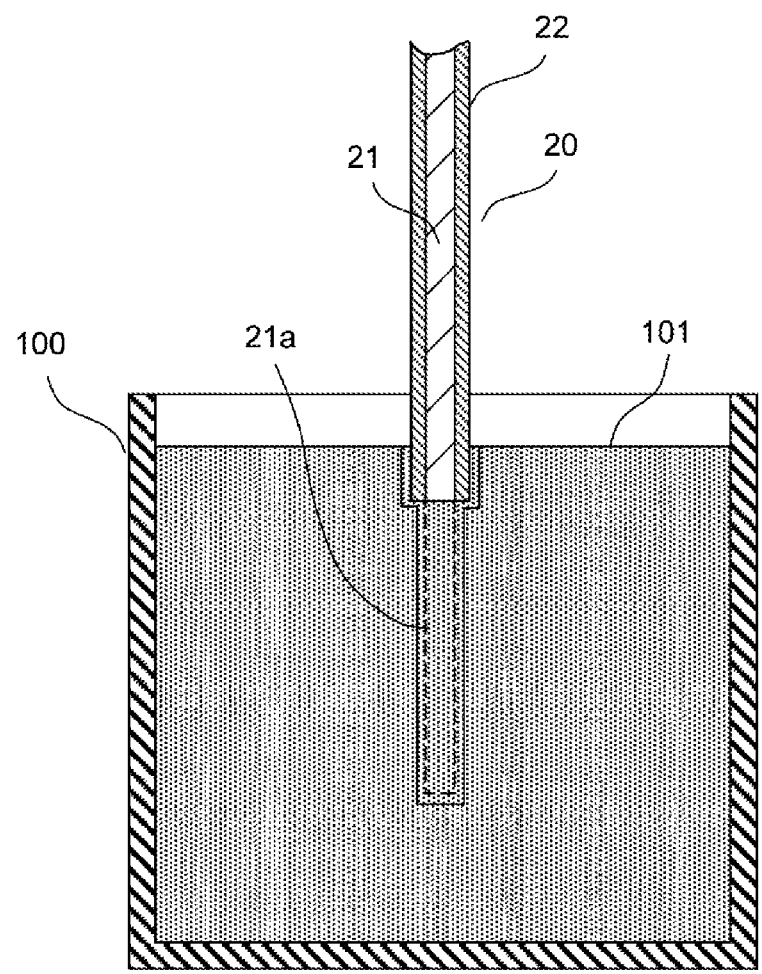
FIG. 3B is a diagram for explaining a method for causing the solder attached to the first exposed part of the stranded wire to cover an outer peripheral surface of the insulator according to the second modification.

FIG. 3A is a front cross-sectional view illustrating a main part of film capacitor 1A cut at a position of insulation coated lead wire 20 according to the second modification, and FIG. 3B is a diagram for explaining a method, for causing solder 23 attached to first exposed part 21a of stranded wire 21 to cover an outer peripheral surface of insulator 22 according to the second modification.

As shown in FIG. 3A, in the present modification, solder 23 attached to first exposed part 21a of stranded wire 21 of lead wire 20 is made to further cover the outer peripheral surface of insulator 22 at a side close to the base end. In addition, solder S for connection is not used, and first exposed part 21a of stranded wire 21 and end face electrode 11 are welded by welding and are connected to each other at a part at which solder 23 and end face electrode 11 are in contact with each other. The other configurations are the same as in the first exemplary embodiment.

As shown in FIG. 3B, by immersing not only first exposed part 21a of stranded wire 21 but also the base end side part of insulator 22 in molten solder 101 of solder bath 100, the outer peripheral surface of insulator 22 at the side close to the base end can be covered with solder 23.

With the configuration of the present modification, it is possible to make solder 23 covering first exposed part 21a of stranded wire 21 overlap insulator 22. Hence, solder 23 can more satisfactorily confine the water, which has entered inside insulator 22, inside insulator 22. It is thus possible to further improve the effect of preventing capacitor element 10 from deteriorating.

Also in the above exemplary embodiment and the first modification, first exposed part 21a of each stranded wire 21 and each end face electrode 11 may be connected to each other by welding. In the present modification, first exposed part 21a of each stranded wire 21 and each end face electrode 11 may be connected to each other with solder S for connection.

Second Exemplary Embodiment

Next, film capacitor 1B according to a second exemplary embodiment will be described.

In the present exemplary embodiment, film capacitor 1B is an example of a "capacitor" recited in the claims. End face electrode 51 is an example of an "electrode" recited in the claims. First exposed part 61a is an example of an "exposed part" recited in the claims. Filler resin 80 is an example of "resin" recited in the claims.

However, the above description is only intended to define correspondences between components in the claims and components in the exemplary embodiment. The correspondences described above do not limit the scope of the disclosure in the claims to the configuration described in the exemplary embodiment.

Figure 4A:
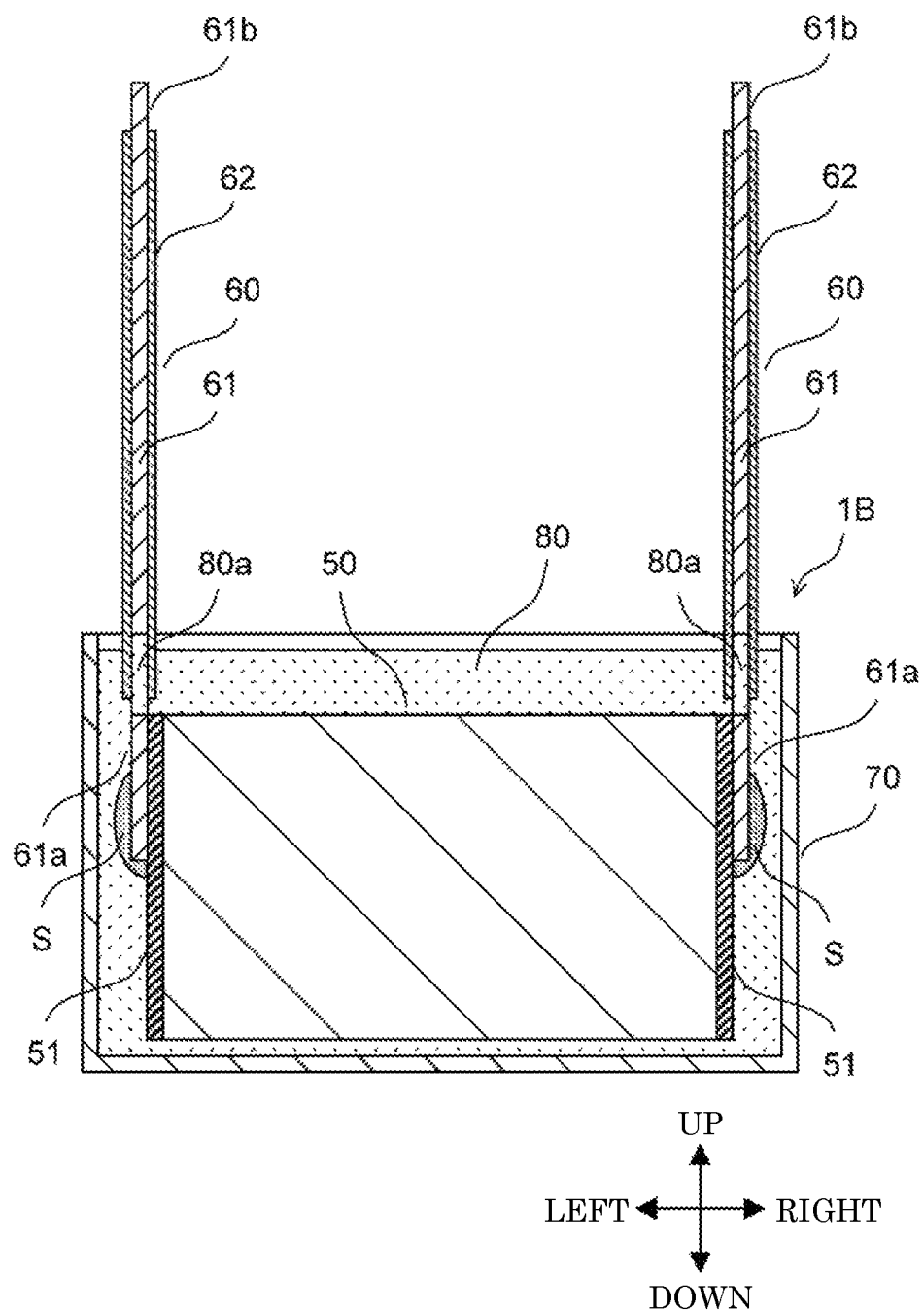
FIG. 4A is a front cross-sectional view illustrating a film capacitor according to a second exemplary embodiment cut to include positions of right and left insulation coated lead wires.
Figure 4B:
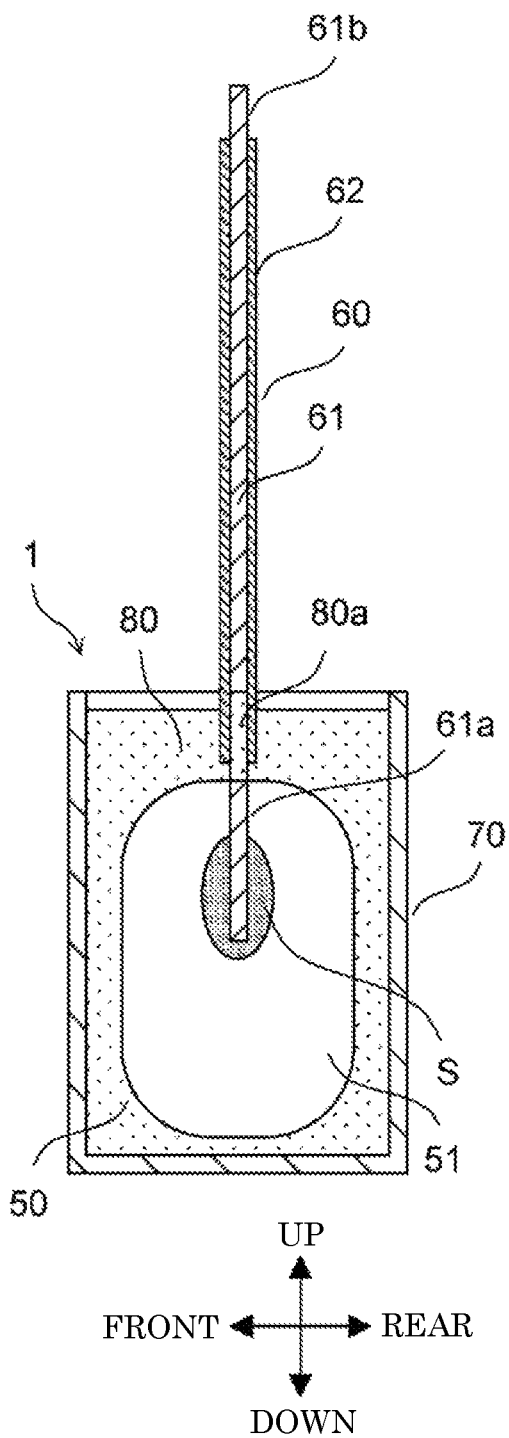
FIG. 4B is a right-side cross-sectional view illustrating the film capacitor cut at a position of the right-side insulation coated lead wire according to the second exemplary embodiment.
Figure 4C:
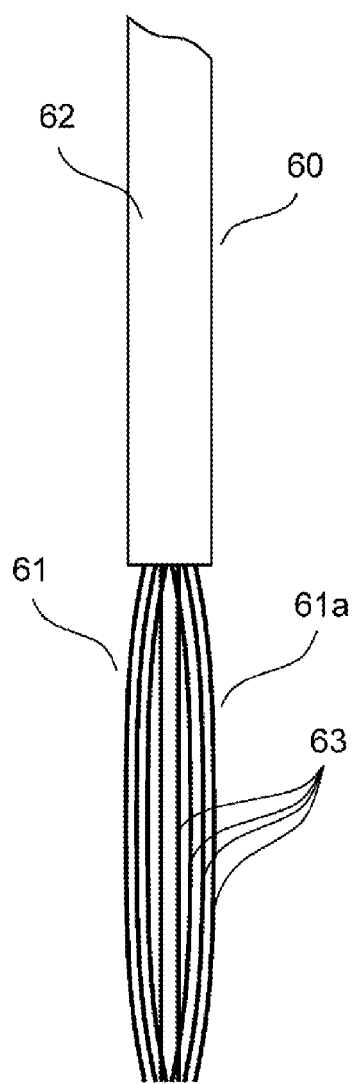
FIG. 4C is a main part enlarged view of the lead wire showing a configuration of a first exposed part of a stranded wire according to the second exemplary embodiment.

FIG. 4A is a front cross-sectional view illustrating film capacitor 1B cut to include positions of right and left insulation coated lead wires 60 according to the second exemplary embodiment, and FIG. 4B is a right-side cross-sectional view illustrating film capacitor 1B cut at a position of right-side insulation coated lead wire 60 according to the second exemplary embodiment. FIG. 4C is a main part enlarged view of lead wire 60 showing a configuration of first exposed part 61a of stranded wire 61 according to the second exemplary embodiment.

As shown in FIG. 4A and FIG. 4B, film capacitor 1B includes capacitor element 50, a pair of insulation coated lead wires 60, case 70, and filler resin 80.

The configurations of capacitor element 50 and case 70 are similar to the configuration of capacitor element 10 and case 30 of the first exemplary embodiment.

A pair of insulation coated lead wires 60 (hereinafter, each simply referred to as "lead wire 60") are each configured with stranded wire 61 and insulator 62 similarly to the configuration of lead wire 20 of the first exemplary embodiment, and each stranded wire 61 includes first exposed part 61a at a side close to a base end of lead wire 60 and second exposed part 61b at a side close to a top end of lead wire 60. Regarding each lead wires 60, first exposed part 61a of stranded wire 61 is connected to each end face electrode 51 of capacitor element 50 by soldering using solder S for connection. However, in the present exemplary embodiment, different from the first exemplary embodiment, first exposed parts 61a of stranded wires 61 are not covered with solder. Further, as shown in FIG. 4C, regarding each stranded wire 61, twist of a plurality of conductive wire 63 constituting stranded wire 61 is untwisted over entire first exposed part 61a and loosened.

Similarly to the first exemplary embodiment, case 70 housing capacitor element 50 and lead wire 60 is filled with filler resin 80. However, different from the first exemplary embodiment, filler resin 80 enters inside each insulator 62 and spreads into a part of stranded wire 61 that is coated with insulator 62. Resin part 80a of filler resin 80 having entered inside insulator 62 enters the minute gaps among stranded wires 61 from a root part of first exposed part 61a and penetrates into a part of the minute gaps among stranded wires 61 which are coated with insulator 62.

Figure 5:
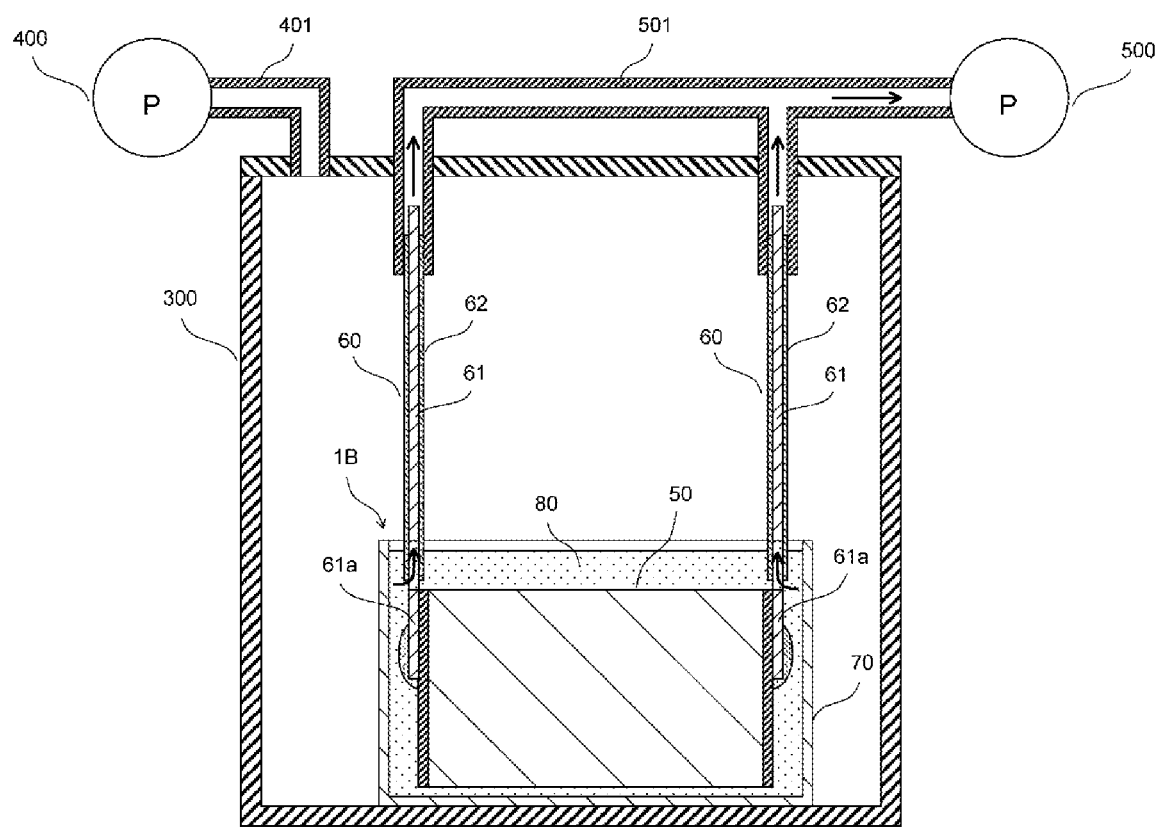
FIG. 5 is a diagram for explaining a method for causing a filler resin enter inside an insulator according to the second exemplary embodiment.

FIG. 5 is a diagram for explaining a method for causing filler resin 80 to enter inside insulator 62 according to the second exemplary embodiment.

As shown in FIG. 5, when case 70 is to be filled with filler resin 80, case 70 housing capacitor element 50 and lead wire 60 is put in vacuum case 300. Suction nozzle 401 of first vacuum pump 400 is connected to vacuum case 300. In vacuum case 300, suction nozzle 501 of second vacuum pump 500 is connected to each of the top end side parts of right and left lead wires 60.

After filler resin 80 in a molten state is injected in case 70 and before the inside of vacuum case 300 is made in a vacuum state by an operation of first vacuum pump 400, second vacuum pump 500 is made to operate, and air is suctioned from top end side parts of lead wires 60 by second vacuum pump 500. Molten filler resin 80 in case 70 is made to climb up the minute gaps among stranded wires 61 by this suction and enters inside insulators 62. At this time, since each first exposed part 61a is untwisted at the root part of stranded wire 61, filler resin 80 in a molten state easily enters the minute gaps of each stranded wire 61 from the root part.

Then, when filler resin 80 in case 70 is cured, filler resin 80 is spread into the part of stranded wire 61 coated with insulator 62.

Regarding film capacitor 1B of the present exemplary embodiment, if water (moisture) enters inside insulator 62 from the top end side part of lead wire 60, the water having entered easily reaches the base end side part of lead wire 60 through the minute gaps among stranded wires 61. In the present exemplary embodiment, even if the above situation has occurred, since filler resin 80 is spread into the part of stranded wire 61 coated with insulator 62 at a side close to the base end of lead wire 60, such resin part 80a stops the water, and end face electrode 51 is prevented from being exposed to the water.

As described above, with the present exemplary embodiment, similarly to the first exemplary embodiment, water is prevented from entering through lead wires 60, and it is therefore possible to prevent capacitor element 50 from deteriorating due to oxidation of end face electrodes 51 and the internal deposition electrodes.

Other Modifications

In the first exemplary embodiment, solder may entirely cover second exposed part 21b of each stranded wire 21 on the top end side part of lead wire 20. Further, the solder attached to each second exposed part 21b may be made to enter inside insulator 22 and to spread into a part of stranded wire 21 coated with insulator 22. Further, the solder attached to each second exposed part 21b may be made to cover the outer peripheral surface at a side close to the top end of insulator 22. With these configurations, the solder attached to each second exposed part 21b can prevent water from entering inside insulator 22, and the effect of preventing capacitor element 10 from deteriorating is further improved.

Further, although the twist of entire first exposed part 61a of stranded wire 61 of each lead wire 60 is untwisted in the second exemplary embodiment, at least the twist of the root part of each first exposed part 61a only has to be twisted.

Further, regarding lead wire 20 of the first exemplary embodiment, it may be configured that at least the root part of first exposed part 21a of stranded wire 21 is untwisted. Such a configuration makes molten solder 101 easily enter inside the minute gaps among stranded wires 21 from the root part of first exposed part 21a in a step of attaching solder 23 to first exposed part 21a.

Further, it is possible to combine the configuration of the first modification of the first exemplary embodiment and the configuration of the second modification of the first exemplary embodiment. Specifically, solder 23 attached to first exposed part 21a of stranded wire 21 may be made to reach the inside and the outer periphery of insulator 22.

Further, in the first exemplary embodiment and the second exemplary embodiment, each of capacitor elements 10, 50 is formed by stacking two metalized film each of which is made of a dielectric film with a deposition electrode formed on the dielectric film and by winding or laminating the stacked metalized films. However, other than the above, each of capacitor elements 10, 50 may be made by stacking an insulation film and a metalized film made of a dielectric film on the both sides of which deposition electrodes are formed, and by winding or laminating the insulation film and the metalized film.

In the first exemplary embodiment and the second exemplary embodiment, an example is disclosed in which the present disclosure is applied to each of film capacitors 1A, 1B which are of a so-called case mold type and in which cases 30, 70 respectively housing capacitor elements 10, 50 are filled with filler resins 40, 80. However, the present disclosure may be applied to a so-called caseless type film capacitor in which capacitor element 10, 50 is not housed in case 30, 70 but covered with an outer packaging resin.

In the first exemplary embodiment and the second exemplary embodiment, film capacitors 1A, 1B are taken as an example of a capacitor of the present disclosure. However, the present disclosure can be applied to a capacitor other than film capacitors 1A, 1B.

Other than the above modifications, various modifications can be appropriately made to the exemplary embodiments of the present disclosure within the scope of the technical idea disclosed in the claims.

The present disclosure is useful for capacitors used for various types of electronic equipment, electrical devices, industrial equipment, vehicular electric equipment, and the like.

What is claimed is:

1. A capacitor comprising:
    a capacitor element;
    an insulation coated lead wire connected to an electrode of the capacitor element; and
    a resin covering the capacitor element and the insulation coated lead wire in a state that one end of the insulation coated lead wire is exposed from the resin, wherein:
    the insulation coated lead wire includes: a stranded wire in which a plurality of conductive wires are twisted with each other; and an insulator covering the stranded wire,
    an exposed part of the stranded wire is connected to the electrode of the capacitor element, the exposed part being exposed from the insulator at another end of the insulation coated lead wire,
    the exposed part is entirely covered with solder, and
    the solder covers an outer peripheral surface of the insulator.

2. The capacitor according to claim 1, wherein the solder is spread into a part of the stranded wire, the part being covered with the insulator.

3. A capacitor comprising:
    a capacitor element;

an insulation coated lead wire connected to an electrode of the capacitor element; and a resin covering the capacitor element and the insulation coated lead wire in a state that one end of the insulation coated lead wire is exposed from the resin, wherein:

the insulation coated lead wire includes: a stranded wire in which a plurality of conductive wires are twisted with each other; and an insulator covering the stranded wire, an exposed part of the stranded wire is connected to the electrode of the capacitor element, the exposed part being exposed from the insulator at another end of the insulation coated lead wire, and a part of the resin is disposed inside the insulator to be spread into a part of the stranded wire, the part of the stranded wire being coated with the insulator.

4. The capacitor according to claim 2, wherein the stranded wire is untwisted at a root part of the exposed part.

5. The capacitor according to claim 3, wherein the stranded wire is untwisted at a root part of the exposed part.

* * * * *